May 19, 1970 H. OBERMEIER 3,512,455

INDEXING PISTON FOR AN INTERNAL COMBUSTION ENGINE

Filed Oct. 25, 1968

Inventor:
Hermann Obermeier
BY Pennie, Edmonds,
Morton, Taylor and Adams
ATTORNEYS

3,512,455
INDEXING PISTON FOR AN INTERNAL COMBUSTION ENGINE

Hermann Obermeier, Winterthur, Switzerland, assignor to Sulzer Brothers Limited, Winterthur, Switzerland, a Swiss company
Filed Oct. 25, 1968, Ser. No. 770,656
Claims priority, application Switzerland, Oct. 27, 1967, 15,103/67
Int. Cl. F01b 3/00; F16j 1/24
U.S. Cl. 92—31                            2 Claims

ABSTRACT OF THE DISCLOSURE

The indexing mechanism for an indexing piston assembly comprises an indexing ring disposed about the spherical bearing of the piston at the small end of the connecting rod, the indexing ring being caused to reciprocate in a plane perpendicular to the longitudinal axis of the piston by the pivoting motion of the connecting rod relative to the piston. Rollers received in recesses formed in the inner cylindrical surface of a roller retainer ring are urged by springs into jamming engagement with the outer cylindrical surface of the reciprocating indexing ring when the indexing ring rotates in one direction, the rollers being released from said jamming engagement when the indexing ring rotates in the other direction.

BACKGROUND OF THE INVENTION

Indexing pistons for internal combustion engines (that is, a piston that is caused to rotate about its longitudinal axis as the piston travels longitudinally back and forth within the cylinder) are well known in the art. For example, Swiss Pat. 200,762 discloses an indexing piston in which the indexing member is in the form of a reciprocating slotted ring having a friction surface that is adapted to be thrust into frictional engagement with a mating friction surface on the piston by means of the pivoting motion of the connecting rod relative to the piston. The indexing ring frictionally engages the piston in one direction of movement of the connecting rod while in the other direction of movement it slides over the mating friction surface of the piston. This type of indexing piston normally provides excellent results with respect to the progressive rotation of the piston about its axis. However, the relative movement of the indexing ring and the piston eventually wears away their mating friction surfaces to the point that no further indexing motion of the piston will take place.

SUMMARY OF THE INVENTION

I have now devised an improved indexing piston that is simple, rugged and subject to little wear. The indexing mechanism of the piston is provided with lockable rollers which lock or jam when the indexing means rotates in one direction and which unlock when the indexing means rotates in the other direction, thereby allowing the indexing means to "free wheel" with respect to the piston. The indexing piston assembly of my invention comprises a trunk piston mounted on the end of a connecting rod by a piston bearing that permits the piston to rotate about an axis coinciding with the longitudinal axis of the piston. Annular indexing means are mounted within the piston adjacent the pivot point at the end of the connecting rod, said indexing means being free to reciprocate about the longitudinal axis of the piston in a plane substantially perpendicular to said axis. Reciprocating drive means are mounted on the connecting rod adjacent the pivot point thereof, said drive means engaging drive means receiving notches formed in the indexing means whereby the pivoting motion of the connecting rod relative to the piston causes the indexing means to reciprocate rotationally about the longitudinal axis of the piston. A roller retainer ring is disposed about the annular indexing means with the inner cylindrical surface of the retainer ring disposed in close but non-contacting proximity to the outer cylindrical surface of the indexing means, the retainer ring being firmly secured to the piston. A plurality of roller receiving recesses are formed in the inner surface of the retainer ring, each recess having an oblique rear wall whereby one end of the recess is of lesser depth than the other end of the recess. An axially disposed roller is positioned in each recess, and spring means are provided in each recess for urging the roller received therein toward the small end of the recess. as a result, when the annular indexing means rotates in one direction (for example), counterclockwise with respect to the axis of the piston), the spring-loaded rollers are caused to be jammed between the oblique rear walls of the recesses and the outer surface of the indexing means whereby the retainer ring (and the piston secured thereto) are caused to rotate with the indexing means. Conversely, when the annular indexing means rotates in the other direction (clockwise with respect to the piston axis), the jamming forces are relieved and the indexing means "free wheels" in contact with the freely turning rollers without effecting any rotational movement of the piston.

BRIEF DESCRIPTION OF THE DRAWING

The invention will be more fully described in conjunction with the accompanying drawings of which.

DETAILED DESCRIPTION

Figure 1:
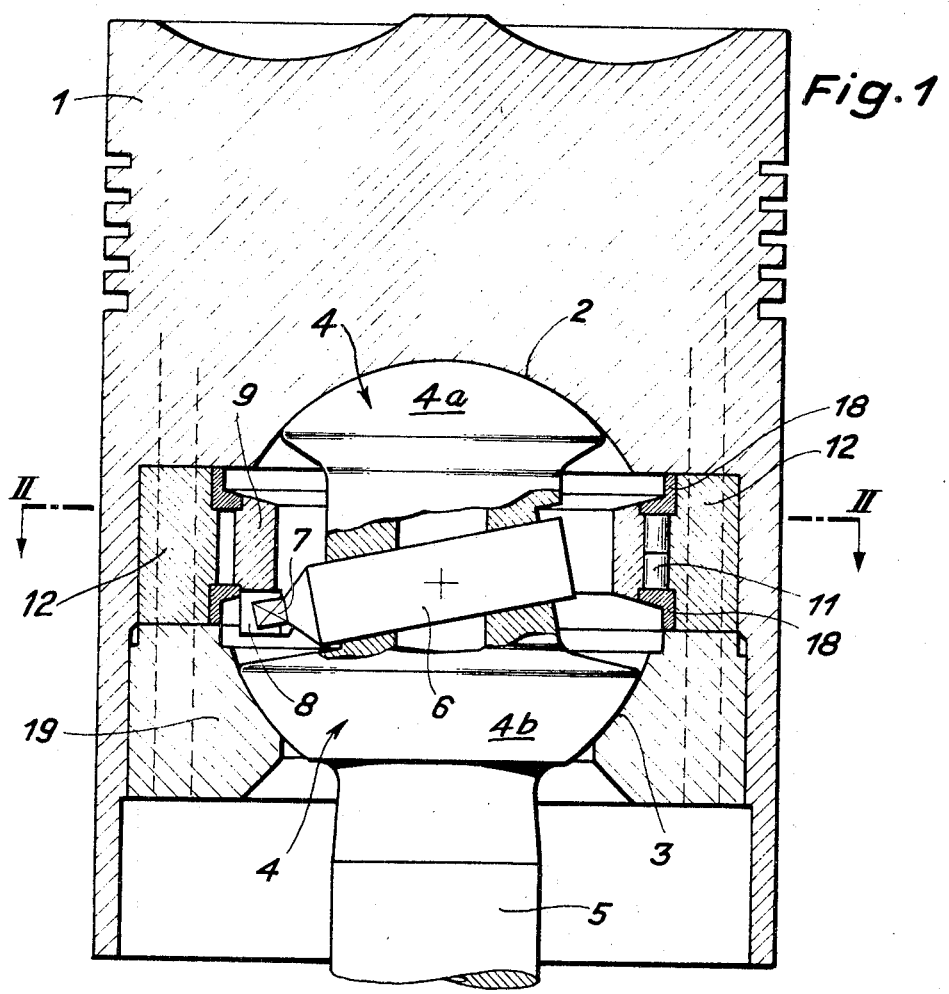
FIG. 1 is a sectional view through the center of an indexing piston embodying my invention, the spherical bearing at the upper end of the crankshaft being shown partly whole and partly in section.

In the embodiment of my invention shown in the drawing the indexing piston assembly comprises a trunk piston rotatably mounted on a spherical piston bearing located at the small end of a suitable connecting rod. The axis of the engine crankshaft (which is not shown in the drawing) lies in the plane of the drawing. Accordingly, the small end of the connecting rod pivots about an axis that also lies in the plane of the drawing, and the lower portion of the connecting rod moves to-and-fro in a plane perpendicular to the plane of the drawing.

Figure 2:
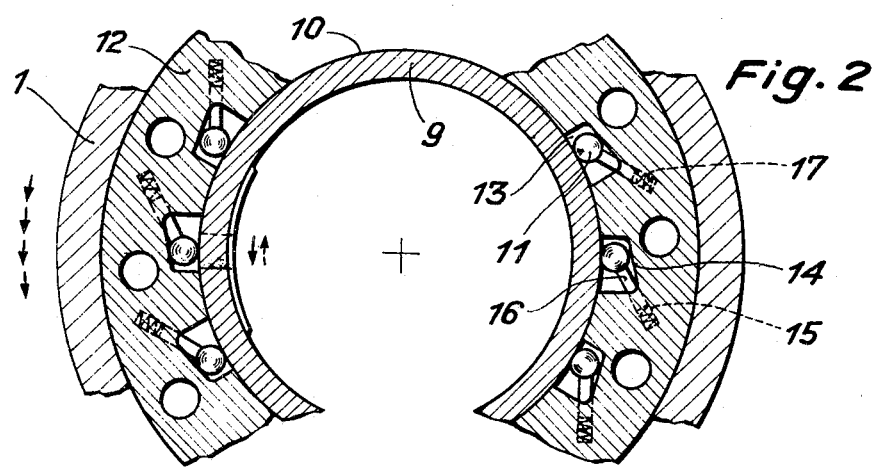
FIG. 2 is a sectional view along lines II—II of FIG. 1.

In the embodiment of my invention shown in FIGS. 1 and 2, the trunk piston 1 of an interna 1 combustion piston engine is provided with upper and lower spherical bearing surfaces 2 and 3 which cooperate with upper and lower bearing surfaces 4a and 4b of the spherical bearing head 4 of connecting rod 5. The lower bearing surface 3 of the piston is formed in an annular bearing member 19 which bears against an intermediate roller retainer ring 12, the bearing member 19 and retainer ring 12 being secured to the piston 1 by means of bolts (now shown). The roller retainer ring 12 comprises an essential part of the free wheel indexing mechanism hereinafter described, the retainer ring member 12 and the bearing member 19 being secured to the piston 1 so that these three parts rotate about the spherical bearing head 4 as a unit.

The free wheel indexing mechanism comprises an inclined pin 6 which extends through the center of the spherical bearing head 4, a lineally reciprocating drive member 7 disposed at one end of the pin 6, a rotationally reciprocating annular indexing member 9, the indexing member 9 being provided with a recess 8 adapted to receive the reciprocating drive member 7, the aforementioned roller retainer ring 12, and a plurality of spring-loaded rollers 11 disposed in recesses 13 formed in the inner periphery of the retainer ring 12. Moreover, guide rings 18 are located above and below the recesses 13 formed in the retainer ring 12. The dimensions of the annular indexing member 9 and the roller retainer ring 12 are such that the ring 12 is free to turn or rotate about the outer cylindrical surface 10 of the indexing member 9.

As noted, each of the rollers 11 is disposed in a recess 13 formed in the inner peripheral surface of the ring 12. Each recess 13 has an oblique rear surface 14 which causes the axially disposed roller 11 contained in the recess to be brought into jamming engagement with the outer surface 10 of the indexing member 9 when the roller 11 is moved to the small end of the recess 13. Each roller 11 is urged toward the small end of its recess 13 by the push rod 16 and coil spring 17 received in the blind hole 15 associated with the recess 13. As a result, when the indexing member 9 is caused to rotate counterclockwise as shown in FIG. 2, the spring-loaded push rods 16 press the rollers 11 into jamming engagement with the outer surface 10 of the indexing member 9 so that the ring 12 and the piston 1 will also be caused to rotate with the indexing member 9. Conversely, when the indexing member 9 is caused to rotate clockwise, the tendency of the rollers 11 to be jammed against the outer surface 10 of the indexing member 9 is cancelled out and the indexing member 9 rotates freely or "free wheels" within the retainer ring 12.

The axis of the pin 6 lies in the plane of, and is inclined at an angle with respect to, the axis about which the connecting rod 5 and bearing head 4 pivot. As a result, the drive member 7 is vertically displaced a short distance below the pivot axis of the connecting rod 5, as clearly shown in FIG. 1. When the internal combustion engine is in operation the piston 1 travels longitudinally to-and-fro within the cylinder while the connecting rod 5 pivots back and forth relative to the piston about the axis of the spherical bearing head 4. (As noted, the axis about which the connecting rod 5 pivots is located in the plane of the drawing, and therefore the connecting rod pivots backward and forward in a path perpendicular to the plane of the drawing.) Owing to the vertical displacement of the drive member 7 relative to the pivot axis of the connecting rod 5, the reciprocating pivoting motion of the connecting rod relative to the piston 1 imparts a reciprocating rotational movement to the indexing member 9 with which the drive member 7 is engaged. This reciprocating rotational movement of the indexing member 9 is indicated by the arrows adjacent the part 9 in FIG. 2 of the drawing. When the piston rod 5 pivots in one direction (namely, toward the viewer as shown in FIG. 1), the indexing member 9 is caused to move rotationally in a counterclockwise direction. This, in turn, causes the spring-loaded rollers 11 to be jammed between the outer surface 10 of the indexing member 9 and the oblique surfaces 14 of the recesses 13 in which the rollers are received, thereby causing the retainer ring 12 and piston 1 also to rotate counterclockwise. When the connecting rod 5 pivots in the opposite direction (namely, away from the viewer as shown in FIG. 1), the indexing member 9 is caused to rotate in a clockwise direction, thereby relieving the jamming pressures on the rollers 11 and allowing the indexing member 9 to free-wheel within the retainer ring 12. The piston 1 therefore carries out an intermittent counterclockwise rotational movement about the longitudinal axis of the piston as indicated by the arrows adjacent the piston 1.

The construction embodying the invention is simple, inexpensive and robust and is subject to little wear during operation. Various modifications of the construction shown in the drawings are, of course, possible. For example, any form of free wheeling clutch may be used. Preferably the free wheeling mechanism should be simple and robust and not require special adaptation for various rotation motions of the indexing member. Alternatively, however, free wheel mechanisms embodying, for example, pawls on the member 9 which engage teeth in the ring 12 may be used.

I claim:

1. An indexing piston assembly for an internal combustion piston engine, said assembly comprising a trunk piston rotatably mounted on the small end of a connecting rod, a reciprocating piston indexing ring mounted within the piston adjacent the pivot point at the small end of the connecting rod, reciprocating drive means mounted on the connecting rod adjacent the pivot point thereof, said drive means engaging a drive means receiving notch formed in said indexing ring, a roller retainer ring disposed about the indexing ring in close proximity to the outer cylindrical surface of said indexing ring, said retainer ring being secured to the piston, a plurality of roller receiving recesses formed in the inner surface of the retainer ring, each recess having an oblique rear surface whereby one end of said recess is of lesser depth than the other end thereof, an axially disposed roller positioned in each recess, and spring means urging each roller toward the small end of the recess in which it is received and into contact with the outer cylindrical surface of the indexing ring.

2. The piston assembly according to claim 1 in which the small end of the connecting rod is provided with a spherical bearing head on which the trunk piston is rotatably mounted, and in which the reciprocating drive means comprises an inclined pin that extends through the center of the spherical bearing head, one end of said pin being provided with a drive member that engages the indexing ring of the piston.

References Cited

UNITED STATES PATENTS

| 634,654 | 10/1899 | Whitcomb | 92—31 XR |
| 1,670,549 | 5/1928 | Pearce | 92—31 XR |
| 2,096,562 | 10/1937 | Sarfaty | 92—31 |
| 2,819,936 | 1/1958 | Cambeis | 92—31 |
| 2,902,987 | 9/1959 | Schweitzer et al. | 92—31 XR |

FOREIGN PATENTS

| 794,282 | 4/1958 | Great Britain. |
| 940,690 | 9/1962 | Great Britain. |

MARTIN P. SCHWADRON, Primary Examiner

L. J. PAYNE, Assistant Examiner

U.S. Cl. X.R.

92—187